United States Patent [19]

Beck

[11] Patent Number: 4,523,282

[45] Date of Patent: Jun. 11, 1985

[54] ANTISKID CONTROL CIRCUIT

[75] Inventor: Arnold A. Beck, Clinton, Ohio

[73] Assignee: Goodyear Aerospace Corporation, Akron, Ohio

[21] Appl. No.: 355,502

[22] Filed: Mar. 8, 1982

[51] Int. Cl.³ .............................................. B60T 8/08
[52] U.S. Cl. ..................................... 364/426; 303/95; 303/97
[58] Field of Search ................... 303/97, 92, 95, 110, 303/105, 20; 364/426

[56] References Cited

U.S. PATENT DOCUMENTS

| 3,540,779 | 11/1970 | Marouby | 303/105 |
| 3,889,128 | 6/1975 | Luhdorff | 303/97 X |
| 4,003,607 | 1/1977 | Haney et al. | 303/92 |

*Primary Examiner*—J. V. Truhe
*Assistant Examiner*—Saul M. Bergmann
*Attorney, Agent, or Firm*—P. E. Milliken; L. A. Germain; R. L. Weber

[57] ABSTRACT

An antiskid control circuit for aircraft or other braked vehicles in which a deceleration detector determines the instantaneous rate of deceleration of the vehicle, and provides a deceleration signal to an integrator and lead network, in parallel interconnection. The outputs of the lead network and modulator are applied to an antiskid valve through a summing circuit. The deceleration detector is provided with a selectable gain, such that the gain is greater when the wheel is decelerating than when it is accelerating, allowing the integrator to obtain an average charge as a function of deceleration.

9 Claims, 1 Drawing Figure

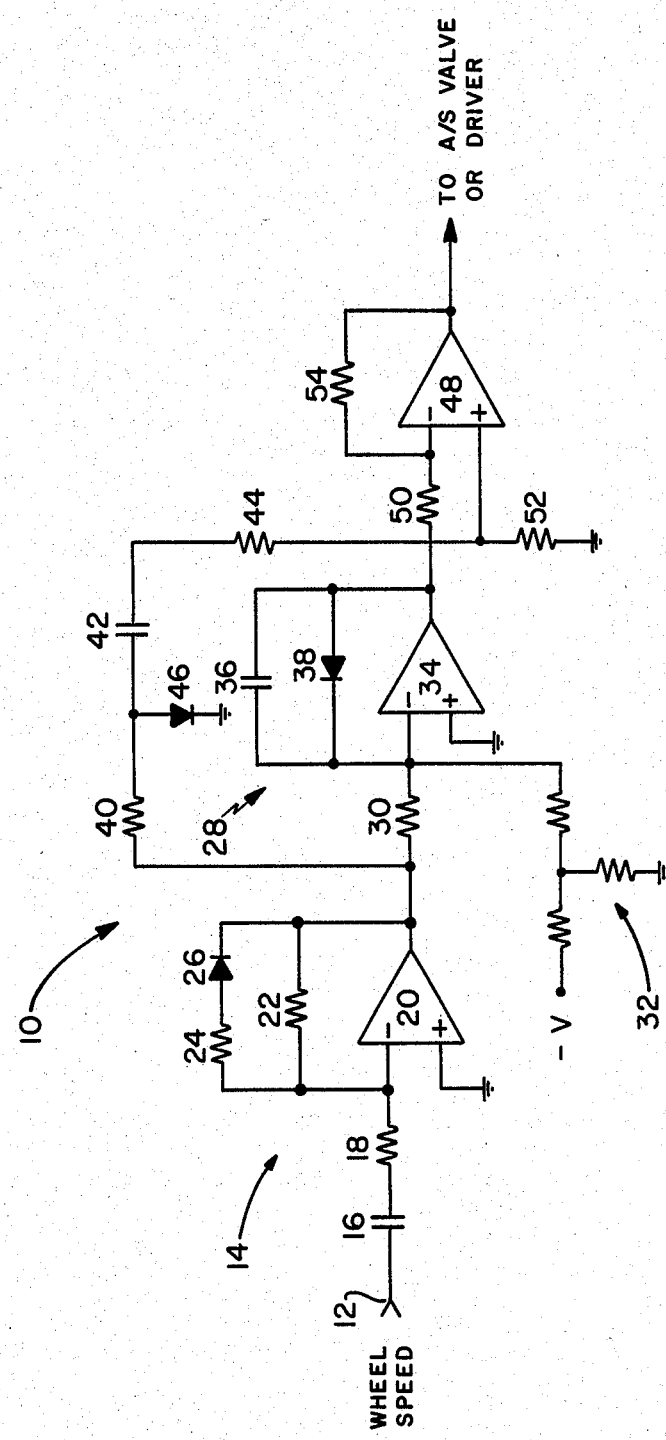

4,523,282

ANTISKID CONTROL CIRCUIT

TECHNICAL FIELD

The invention herein resides in the art of brake control systems and, more particularly, to what has conventionally become known as an antiskid control system. The discussion of the invention hereafter will be with respect to an antiskid control circuit adapted for implementation with a single wheel or pair of braked wheels in a vehicle such as an aircraft. It will be understood that aircraft having plural wheels or braked wheels will include a plurality of such circuits.

BACKGROUND ART

There are many known systems which operate in conjunction with the braking system of a vehicle to prevent skidding or excessive deceleration. Particularly, the aircraft industry has found a keen need for such systems, to allow the aircraft to attain maximum braking effort, consistent with passenger comfort and safety, while reducing wear on the aircraft tires and obtaining shorter distance stops than previously known. These antiskid control systems allow the braking effort of the aircraft to approach a skidding situation, but release brake pressure prior to or at the skid since braking efficiency drops off drastically in a skidding situation.

Early antiskid systems were of the "bang-bang" or "on/off" type in which the antiskid brake valve was either fully opened or fully closed, there being no metering of such valve. Such systems were of a rudimentary nature, allowing for some increase in braking efficiency over the previously known art, but failing to approach optimization.

Present day antiskid control systems obtain a high degree of control, providing for proportional, integral, and derivative control, but do so with systems which are often complex, expensive, and of undesirable weight for utilization in an aircraft. The sophistication of presently known systems makes them unsuited for many aircraft applications.

Presently needed in the aircraft industry is a simple, lightweight, inexpensive, and reliable antiskid system which can achieve accurate metering of brake pressure in response to wheel speed signals. Further, it is most desirable that in such a system the benefits of reduced cost, weight, and maintenance, and the increased reliability of the system more than compensate for any reduction in performance experienced over the more complicated prior art systems.

DISCLOSURE OF INVENTION

In light of the foregoing, it is an object of a first aspect of the invention to provide an antiskid brake control circuit which is simplistic in design, requiring few parts, and being of resultant light weight and low cost.

Another object of an aspect of the invention is to provide an antiskid brake control circuit which is highly responsive to changes in wheel speed, reliable in operation, and easy to maintain.

The foregoing and other objects of aspects of the invention which will become apparent as the detailed description proceeds are achieved by an antiskid control circuit, comprising: a deceleration detector receiving an input signal corresponding to the instantaneous speed of a wheel and generating therefrom a deceleration signal; modulation means connected to and receiving said deceleration signal from said deceleration detector for generating a brake control signal therefrom dependent upon rotational activity of the wheel; and gain selection means connected to said deceleration detector for changing the output gain of said deceleration detector as a function of said rotational activity of the wheel.

BRIEF DESCRIPTION OF DRAWING

For a complete understanding of the objects, techniques, and structure of the invention, reference should be had to the following detailed description and accompanying drawing wherein there is shown a schematic block diagram of the antiskid control circuit of the invention.

BEST MODE FOR CARRYING OUT THE INVENTION

With reference now to the drawing, it can be seen that an antiskid control circuit according to the invention is designated generally by the numeral 10. A wheel speed signal is received at an input 12 and is a DC signal having an amplitude varying according to the instantaneous wheel speed of the associated vehicle. Typically, such an input would be derived from either a DC wheel speed transducer or from a converter and AC transducer. In either event, the wheel speed signal is passed to a deceleration detector comprising a differentiator 14 which generates a signal corresponding to instantaneous velocity change of the associated wheel.

The differentiator 14 includes a differentiating capacitor 16, connected through an input resistor 18 to an amplifier 20. The gain of the amplifier 20 is determined by the dual branched feedback network wherein one leg consists of the resistor 22, and the other leg of resistor 24 and diode 26. When the diode 26 is reverse biased and, accordingly, drops the resistor 24 from the circuit, the gain of the amplifier 20 is determined by the relationship between the input capacitor 16 and the feedback resistor 22. When, however, the diode 26 is forward biased, the feedback resistors 22,24, in parallel interconnection, affect the gain of the amplifier 20 in relation to the input capacitor 16. Accordingly, the amplifier 20 has two separate and distinct gains associated therewith, a high gain when the wheel speed to the input 12 indicates that the wheel is decelerating, and a lower gain when such input indicates that the wheel is accelerating. Having different gains for acceleration and deceleration at the deceleration detector 14 is most desirable, to allow the integrator or modulator 28 to receive a charge on skids or during periods of excessive deceleration, while not totally losing that charge when brake pressure is released and the wheel is allowed to spin-up. Without the differences in gain for acceleration and deceleration, the charge imparted to the integrator 28 on skidding or excessive deceleration would be discharged when the wheel was allowed to spin-up, preventing the circuit 10 from adapting to the mu of the runway as determined by the skidding activity.

The output of the amplifier 20, functioning as a differentiating amplifier, is a signal corresponding to deceleration or acceleration of the wheel and is applied via an input resistor 30 to the integrator or modulator 28. A voltage divider 32 is also connected to this negative input of the amplifier to provide a bias thereat to set a threshold for incipient skids. In other words, the bias of the voltage divider 32 sets the threshold at which output signals from the deceleration detector 14 will effect the integrator 28.

As shown, the integrator 28 consists of an amplifier 34 having an integrating capacitor 36 connected thereacross. In parallel interconnection with the capacitor 36 is a diode 38, interconnected as a unidirectional blocking diode such that the integrator 28 will integrate only positive outputs of the amplifier 20, such outputs being indicative of deceleration.

Also included as part and parcel of the invention is a lead network comprising a resistor 40, a capacitor 42, and a resistor 44. The lead network functions as a differentiator, anticipating incipient skids by the amplitude of the deceleration signal from the deceleration detector 14. A diode 46 may be provided as shown if the vibrational characteristics of the strut to which the wheel is connected so require.

As seen in the drawing, the deceleration signal is applied to a two-branched control circuit, including an integrator or modulator 28, and a lead network 40–46. The lead network, by differentiating the deceleration signal, can anticipate skidding activity, while the integrator 28 provides an output corresponding to a cumulative history of the deceleration of the wheel. As mentioned above, the capacitor 36 charges on deceleration, and discharges on acceleration, but with the differentiator 14 having one gain associated with accelerations and another with decelerations, the capacitor 36 is not totally discharged by a release of brake pressure and subsequent spin-up of the wheel following a skid or the like. Accordingly, the modulator or integrator 28 can accurately maintain a charge corresponding to the history of deceleration or skidding activity of the wheel. In any event, the output of the lead network and the integrator are applied to a summing circuit 48, having input resistors 50, 52 and a feedback 54 as demonstrated. The output of the summing circuit is applied to the antiskid valve or valve driver of the wheel with which the circuit 10 is associated to appropriately meter the brake pressure available to such wheel.

It should now be apparent that the antiskid system of the instant invention is of a simplistic design, resultantly being lightweight and readily adapted for implementation in aircraft use. The deceleration detector 14, having two gains, couples with the integrator 28, to provide an adaptive system, maintaining a history of skidding activity. Also provided as a control element of the circuit is a lead network, differentiating the deceleration signal, and providing a control signal to the antiskid valve which anticipates skidding activity to obtain a release of brake pressure prior to such skids. The performance of the circuit 10 in obtaining antiskid control is outstanding when considered with the simplistic nature of the circuit and the weight savings attained.

Thus it can be seen that the objects of the invention have been achieved by the circuit presented and discussed hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. An antiskid control circuit, comprising:
   a deceleration detector, receiving an input signal corresponding to the instantaneous speed of a wheel and generating therefrom a deceleration signal;
   modulation means connected to and receiving said deceleration signal from said deceleration detector for generating a brake control signal therefrom dependent upon rotational activity of the wheel; and
   said deceleration detector including gain selection means for changing the output gain of said deceleration detector as a function of said rotational activity of the wheel, said gain selection means providing a first gain to said deceleration detector during periods in which the wheel accelerates and a second gain during periods in which the wheel decelerates, said first gain being lower than said second gain.

2. The antiskid control circuit as recited in claim 1 wherein said deceleration detector comprises a differentiating amplifier and said gain selection means comprises a pair of resistors in parallel feedback interconnection across said amplifier, one said resistor being in series interconnection with a diode.

3. The antiskid control circuit as recited in claim 1 wherein said modulation means comprises an integrator, integrating said deceleration signal as to both periods of acceleration and deceleration.

4. The antiskid control circuit as recited in claim 3 which further includes a lead network in parallel interconnection with said integrator, receiving and differentiating said deceleration signal.

5. The antiskid control circuit as recited in claim 4 which further includes a summing circuit receiving and summing outputs from said integrator and lead network and applying said summed output signals to a brake valve.

6. An antiskid control circuit for regulating the brake pressure to the wheel of a braked vehicle, comprising:
   a deceleration detector receiving a signal corresponding to instantaneous wheel speed and generating a deceleration signal therefrom:
   a gain selection circuit interconnected with said deceleration detector, selectively changing the gain of said deceleration detector; and
   an integrator receiving and integrating said deceleration signal and providing said integrated signal to a brake valve.

7. The antiskid control circuit according to claim 6 wherein said gain selection circuit sets a first gain for said deceleration detector when wheel speed is accelerating, and a second when said wheel speed is decelerating.

8. The antiskid control circuit according to claim 7 which further includes a lead network in shunt with said integrator, said lead network receiving said deceleration signal.

9. The antiskid control circuit according to claim 8 which further includes a summing circuit interposed between said brake valve, lead network, and integrator.

* * * * *